United States Patent [19]
Lee

[11] Patent Number: 5,502,924
[45] Date of Patent: Apr. 2, 1996

[54] PLANTER ASSEMBLY HAVING AUTOMATIC WATER-FEEDING AND DRYING INTERVALS

[76] Inventor: John C. Lee, 5 Dey St., Piscataway, N.J. 08854

[21] Appl. No.: 231,504

[22] Filed: Apr. 22, 1994

[51] Int. Cl.$^6$ ................................................ A01G 25/00
[52] U.S. Cl. ................................................ 47/79
[58] Field of Search .......................... 47/79 I, 79 C, 47/66, 79 R

[56] References Cited

U.S. PATENT DOCUMENTS

| | | | |
|---|---|---|---|
| 1,940,044 | 12/1933 | Brandt | 47/79 I |
| 4,067,143 | 1/1978 | Alwell | 47/79 C |
| 4,993,186 | 2/1991 | Immonen | 47/79 I |

FOREIGN PATENT DOCUMENTS

| | | | |
|---|---|---|---|
| 2648008 | 12/1990 | France | 47/79 I |
| 3020915 | 12/1981 | Germany | 47/79 I |
| 0108241 | 5/1984 | Germany | 47/79 I |
| 3338129 | 5/1985 | Germany | 47/79 I |

*Primary Examiner*—Terry Lee Melius
*Assistant Examiner*—Joanne C. Downs
*Attorney, Agent, or Firm*—Ezra Sutton

[57] ABSTRACT

A self-watering and self-drying planter assembly with a water reservoir open to the air and a top downward system for supplying water into the soil through built-in water-feeding channels, each having a water-transfer control lever for controlling the quantity of water supplied to the soil in the planter.

The planter assembly automatically controls the amount of water and nutrients supplied to said plant by controlling the periods of water feeding and the intervening dry periods. There is an inner container assembly including an inner container for receiving a plant and soil, an outer container spaced from and surrounding the inner container and defining therebetween a water-receiving chamber, and a water-supplying chamber below for receiving water from said water-receiving chamber. A float assembly automatically supplies water from the water-receiving chamber to the water-supplying chamber in response to the water level in said water-supplying chamber. The water-feeding channels are connected to the water-supplying chamber for transferring water from the water-supplying chamber to the water-feeding channels for watering the plant.

16 Claims, 7 Drawing Sheets

PLANTER ASSEMBLY HAVING AUTOMATIC WATER-FEEDING AND DRYING INTERVALS

FIELD OF THE INVENTION

This invention relates to a self-watering and self-drying planter with a water reservoir open to the air. More specifically, this invention relates to a top downward system for supplying water into the soil through built-in water-feeding channels, each having water-transfer control levers for controlling the quantity of water supplied to the soil in the planter.

1. Description of Prior Art

Planters of the self-watering type, wherein a reservoir of water is maintained for the plant, are well known. The need to maintain the care and feeding of such plants when there is a prolonged absence of the caretaker for several days to several weeks has prompted prior patent devices, which, in varying degrees, are intended to provide for the feeding of such plants with very little or no attention. However, prior patents in this field have a number of drawbacks.

For example, U.S. Pat. No. 3,261,125 shows a motion-controlling system for plants, which utilizes a wooden block as a sensing means for the control and operation of the watering system.

U.S. Pat. No. 3,534,498 sets forth a plant-watering system which utilizes a porous elongated wick to transfer water to the plant soil from the reservoir by capillary action of the wick.

U.S. Pat. No. 3,747,399 shows a plant-watering system utilizing a capillary material in combination with a porous wick to control soil moisture content.

U.S. Pat. No. 3,758,987 discloses an automatic plant-watering device in which a porous-sensing component functions as an air valve and responds to the moisture condition of the soil to control a water supply. When the soil is very dry, water flows to the soil from the water reservoir until the proper moisture content is reached. When the proper moisture level is reached, the pores of the sensing element become closed to the flow of air, and the flow of water is shut down by the reduction of pressure in the water reservoir.

U.S. Pat. No. 3,775,904 shows a double-walled planter device within which a vacuum is created and thereafter relieved in a controlled process to supply water to the plant soil at the appropriate rate.

U.S. Pat. No. 4,557,070 discloses a double-walled planter which stores a relatively large quantity of water in an adsorbing perlite material in the inner pot section of the planter. This device not only waters the roots in a relatively large root zone area but aerates them as well. An indicator system prevents overwatering, and automatic drainage is provided for the system.

U.S. Pat. No. 4,864,771 is an improvement of U.S. Pat. No. 4,557,071, wherein the plant-watering and feeding system are operable when coupled to a water system having different residual pressures. A plant fertilizer dispenser operates consistently not withstanding wide temperature variations. An improved porous wick transfers the water from the reservoir. Water-level control means are coupled to a conventional water supply and are operative to maintain the water level in the reservoir within a predetermined range. A plant food reservoir includes means for periodically dispensing a quantity of plant food when the water level in the water reservoir reaches a predetermined level.

U.S. Pat. No. 4,819,375 provides for a planter device that has a water-metering system in which an effective water table level can be located below the bottom of a plant receptacle device, without the necessity of deepening the planter device. The effective level of the water table can be below a solid surface on which the planter device is supported. This is accomplished by a sophisticated improvement of the Marriotte principle, involving the coupling of two pressure reducing systems, thereby providing water in a controlled manner to the plant contained within the planter device.

U.S. Pat. No. 4,557,071 sets forth an automatic watering and feeding system for plants in which a multiwalled plant container includes a soil section supporting soil and plants and a reservoir section for accommodating nutrients and water. A porous wick transfers water from the reservoir to the soil, and a pair of floats in communication with the reservoir operate first and second magnetic means, which then cooperate to maintain the appropriate water level and provide for periodic operation of a nutrient feed dispenser.

U.S. Pat. No. 4,885,870 sets forth a planter device that has an inner container surrounded by a water reservoir set above by a support tray. When the water level in the tray receptacle drops, air can pass through a vent pipe to relieve a partial vacuum in the reservoir and allows water to drop through an outlet opening into the tray receptacle space. To avoid water being forced out of the top of the tube by air bubbles, a constriction is provided in a plug at the bottom of the vent pipe, which then restricts the size of the air bubbles entering the pipe.

U.S. Pat. No. 4,916,858 shows a self-watering planter which includes a reservoir to maintain a supply of nutrients and water for the plant rooted therein. More specifically, this invention relates to such a planter in which an accurate visible indication of the amount of nutriated water in the reservoir can be ascertained even as the reservoir is being filled.

None of the prior art patents, however, discloses a self-watering planter with an open air water reservoir having a simple water-control device which automatically provides both watering and drying intervals between waterings for plants that require such attention. Also, none of the aforementioned prior art patents discloses a transfer method using capillary action without the need of fabric or other synthetic materials as a carrier of the water to the potted soil.

2. Background of the Invention

There have been previous inventions to overcome the problems related to the overwatering and/or underwatering of potted plants and also leaving them unattended for extended periods of time. Some of these inventions, as previously cited, possess three main characteristics as follows:

1) The water chamber is below the level of the soil of the planter;
2) The use of fabric or other synthetic absorbent material as a wick to transport the water from the reservoir to the soil by capillary action; and
3) The water is supplied in an upward direction through the bottom section of soil within the planter.

Other such inventions, as previously cited, include a device in which to control the quantity of water the planter system supplies to the soil in the planter. These devices may be summarized into three distinct types:

1) The open air-control system is represented when the water reservoir is not air tight, and the water supply is regulated by the size of the wick or by the number of wicks. The water reservoir sits at the bottom of the planter, and the water is transferred from the bottom upward by capillary flow action. This is an example of bottom watering.

Another type of an open air system is a water reservoir/ bottle, which can be detachably attached to the side of the planter. This water-bottle system has the fabric wicks that extend from the bottom of the water bottle over the wall of the planter and into the soil of the planter. The wicks have two distinct sections, where one section of the wick extends into the bottom of the water bottle, and the other section of wick extends into the potted soil of the planter. When the two sections meet together by overlapping each other at the mouth of the water bottle, the water is transferred from the wet wicks in the water bottle to the dry wicks that extend into the soil by capillary action. The control of the quantity of water supplied to the planter is achieved by the extent of overlapping or touching of the two wick sections at the mouth of the water bottle. Thus, the more contact they have with both wick sections, the more capillary action (flow of water), which causes an increase in the supply of water into the potted soil of the planter. The opposite action of the aforementioned procedure will decrease the quantity of water supplied to the planter. This procedure is a top-watering system, where the wicks water the soil top downward.

2) The air-tight control system is represented when the water reservoir is enclosed and air tight. Water that is released from the reservoir to the soil is displaced by air. The control of the quantity of water supplied to the planter is achieved by controlling the air supply into the water reservoir. The water is released at the bottom of the planter, where the water is then transferred by capillary action (via a wick) upward into the potted soil. There are differing devices which control the air supply into the water reservoir. This procedure is an example of bottom watering where the wicks water the soil bottom upward.

3) The electronic-control system is represented by a sensor device which is located in the potted soil of the planter. The electronic sensor measures the moisture or dryness of the soil. When the sensor indicates that water is needed, a water pump then initiates a supply of water to the top of the potted soil in the planter. This procedure is an example of top watering.

The general object of the present invention is to provide a new and improved planter assembly in the art of self-watering planters.

It is an object of the present invention to provide a self-watering planter having an increased water reservoir capacity in an open container without the need of the reservoir enclosure to be air tight.

Another object of the present invention is that it provides a simple water-supply control device for the transferring of water to the soil of the planter without the need for any complex mechanical or electrical means.

It is a further object of the present invention to provide an automatic arrangement in which to provide watering intervals and drying time intervals between waterings for plants that require such botanical attention.

It is a further object of the present invention to provide a simplified top downward watering system for the growth and nurturing of the plant's health and well being.

It is a further object of the present invention to provide water transfer using the capillary action of soil without the use of fabric wicks or synthetic material wicks as the carrier of water and nutrients to the soil.

It is a further object of the present invention to provide an increased capability of maintaining the proper level of moisture for the plant in its growth.

It is a further object of the present invention to provide longer time periods before any new water and new nutrients are supplemented to the water reservoir.

It is a further object of the present invention to provide an easy procedure for assembly by reducing the number of movable parts of the planter design.

It is a further object of the present invention to provide a simplified design to reduce manufacturing costs for detachably nesting and unnesting of the planter parts.

It is still a further object of the present invention to apply the present concepts to other sizes, shapes, designs, and construction materials of self-watering planters.

SUMMARY OF THE INVENTION

This invention relates generally to a planter assembly which includes a reservoir to maintain a supply of nutrients and water for the plant rooted therein. The plant water and feeding systems used in this invention are particularly intended for plants to remain unattended for substantial lengths of time. More specifically, this invention relates to such a planter in which it is double-walled, self-watering, and self-drying, with an open air water reservoir having a top-down watering system for the soil through built-in wall channels with a water transfer lever attached to the top of each of the water wall channels. The lever system controls not only the quantity of water being transferred from the water source to the potting material but also the length of time (a drying interval) after watering before the next watering is scheduled to start. The lever system for water control uses a float system located in the water-supply chamber at the bottom of the planter for providing the different timing periods for watering and drying intervals needed for the growing and well being of the plant in the self-watering planter.

More particularly, the present invention includes an inner container assembly, an outer container assembly, and essential support accessories. When the two containers along with the support accessories are detachably nested together, they form a double-walled unitary planter. The planter has an inside chamber for potting soil or the like, a water reservoir between the inner and outer container walls, and a water supply chamber at the bottom of the planter for supplying of nutrients and water to the plant.

At the top of the inner and outer container walls, there is a small air gap, permitting some water evaporation, which is beneficial to the exterior surfaces of the plants in the planter. Within the inner container, there are three spaced-apart, built-in (molded to the inner walls) water channels that extend vertically from the bottom (there is a very small gap between the bottom of the wall water channel and bottom of the water basin floor) of the water basin floor to near the top of the inner container. These water channels are filled with sand or potting material, whereby these soil-filled water channels function like wicks, which then transport the water by capillary action from the bottom water supply chamber to the potting soil in the planter. The top (mouth) opening of each water channel is near the top of the inner container chamber, so that the water and nutrients are transferred from the water channel's potting material to the inner container's potting soil. Thus, the watering of the plants occurs at the top of the inner container, which constitutes a top downward self-watering system.

One of the water channels functions as a watering and drying channel. This watering/drying channel provides a drying time interval between watering cycles, which is an important botanical aspect for plant growth and well being of different varieties (species) of plant life. Thus, the present invention also acts as a self-drying system. In addition, a unique water-transfer lever system provides varying degrees of watering and/or drying control to the plants within the inner container's potting soil. The water-transfer lever control system is located on the top opening of each water channel and may be used to give the plant its proper amount of water and nutrients on an as-needed basis, which can be done manually by the user. When the user twists or turns the lever(s), where it is in a closing mode, the water transfer is decreased, and the drying time interval is increased. When the lever is in an open mode, the water transfer is increased, and the drying time interval is lessened, all depending upon the degree of the top opening of the water channel(s) being partially or fully opened, etc. This top downward watering-control system, combined with the water transfer lever control system, minimizes the leaching and washing away of beneficial nutrients from the potting soil and, in addition, lessens the opportunity for any overwatering and/or underwatering of the plants within the self-watering planter.

Aeration of the potted soil is provided by elongated aeration slits at the bottom of the inner container and by a small air vent nipple located in the water basin chamber of the outer container section, which brings the air into the planter from the outside surroundings.

A float system having two connecting parts automatically controls the water supply from the main water reservoir to the bottom water supply chamber. The bottom water supply chamber is divided into two distinct sections or basins comprising a square walled float tank chamber having a lower floor than the outer water basin chamber. The float tank chamber is located in the center area of the bottom water supply chamber, where the float system component is comprised of a float buoy in the float tank and a float pivot component attached to the bottom inner container wall of the main water reservoir. This float system assembly provides for the different timing intervals needed for watering and drying periods and its independence from the water supply of the water basin chamber.

The self-watering planter is preferably constructed of sturdy plastic components but can be made of other materials, like aluminum, brass, copper, glass, or rubber. The planter assembly includes two major components, being the inner and outer containers, and the support accessories, which consist of water-transfer control levers having two parts per lever and the float assembly component having two separate parts. Thus, the total number of parts for this present invention is only ten, having two major component parts and eight support accessory parts which ease the assembly and handling of the self-watering planter by the user.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT

As shown in FIGS. 1 to 4 of the present invention, the self-watering planter 10 assembly includes an inner container assembly 100, a support assembly 200, and an outer container assembly 300, which are detachably nested together to form a unitary, double-walled planter assembly 10. The outer container assembly 300 and support assembly 200 are integrally attached.

The planter assembly 10 includes inner container or chamber 20 for receiving potting soil 60, a water-receiving reservoir 30 between inner and outer walls 106 and 302, and a water-supplying chamber 40 at the bottom of the planter assembly 10.

Figure 1A:
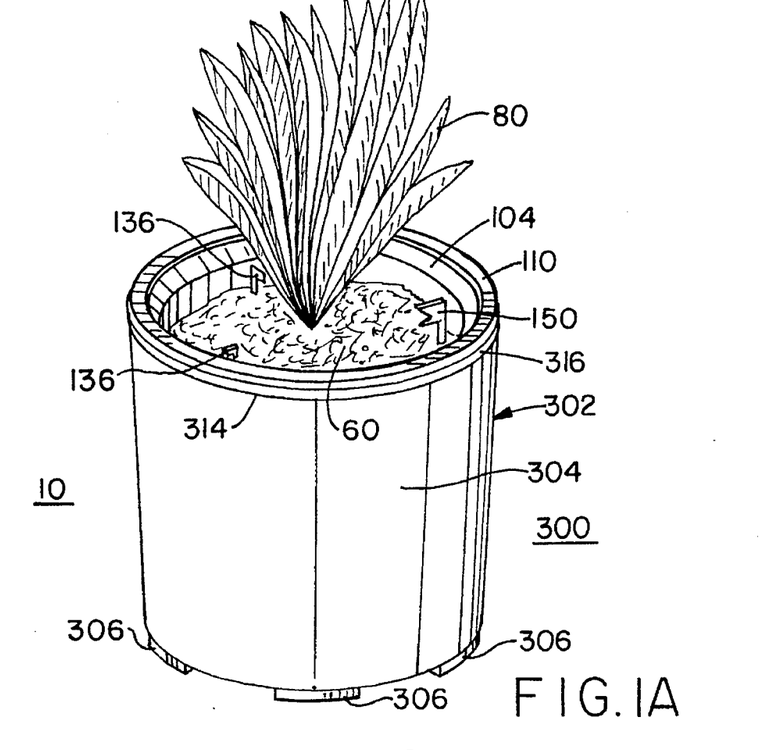
FIG. 1A is a perspective view of the self-watering planter according to the present invention in the fully-assembled condition having a growing plant.
Figure 1B:
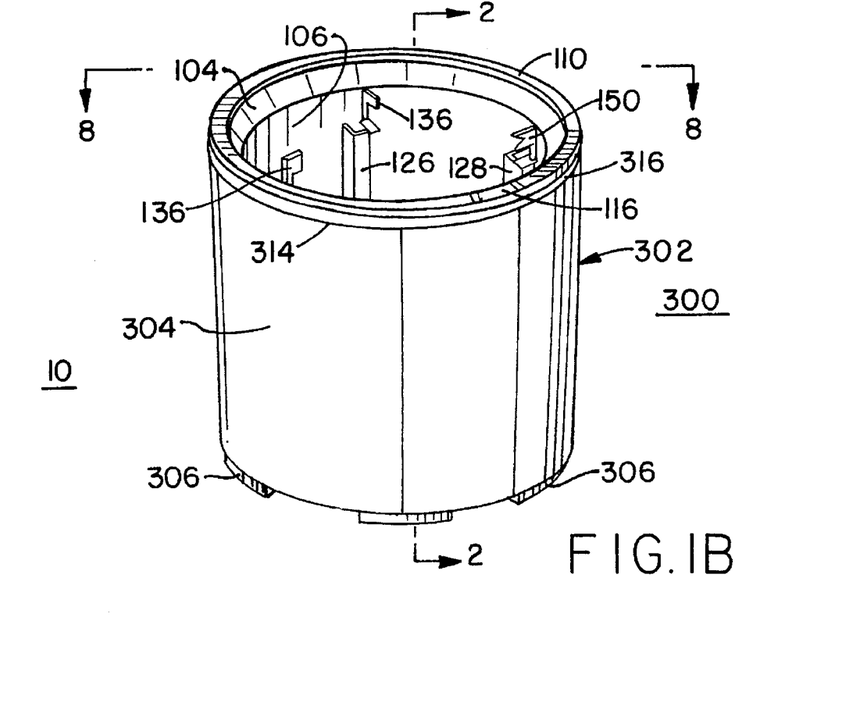
FIG 1B is a perspective view of the self-watering planter according to the present invention in the fully-assembled condition.
Figure 2:
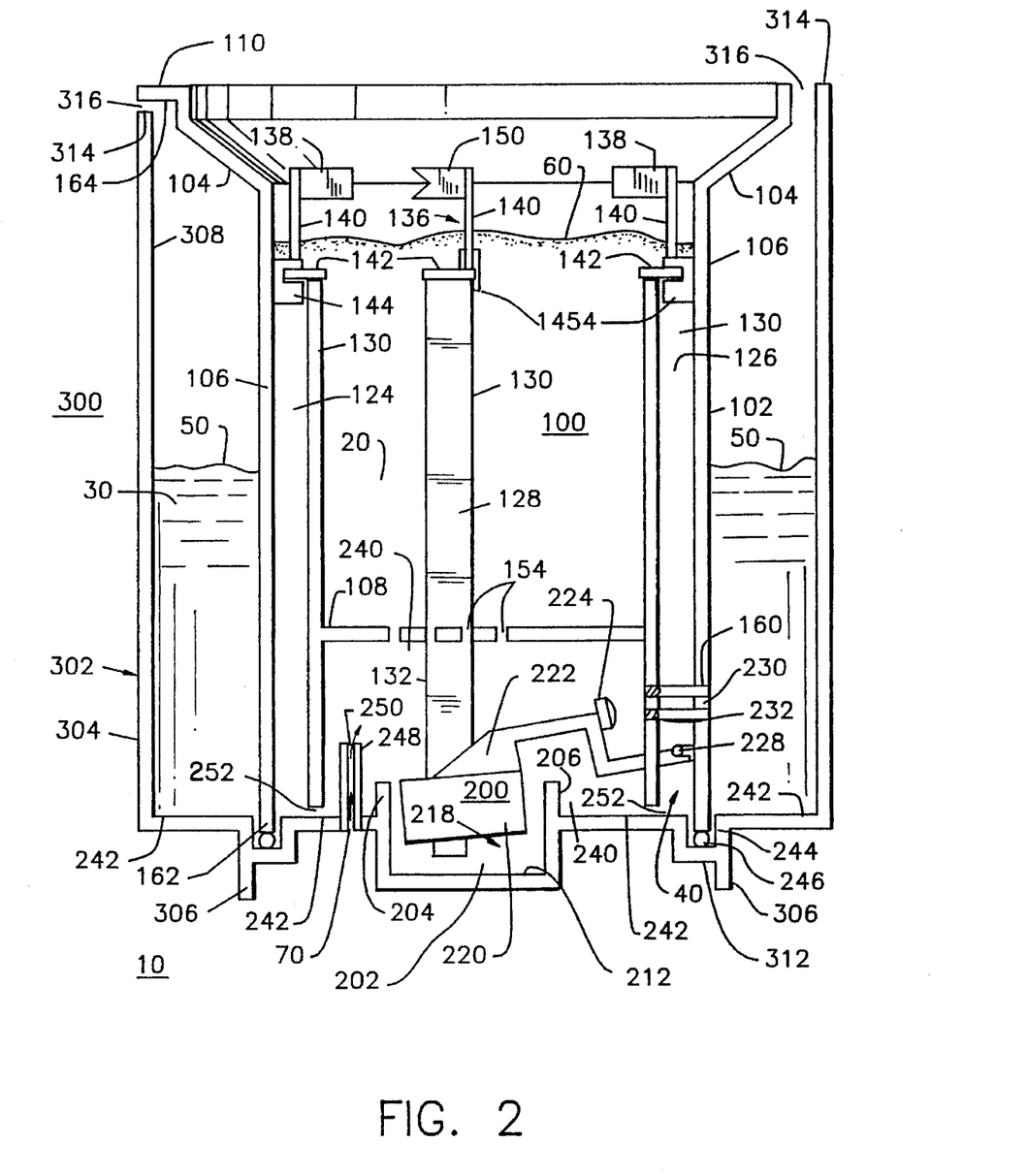
FIG. 2 is a vertical sectional view of the self-watering planter according to the present invention taken along the section line 2—2 of FIG. 1B in the assembled condition.
Figure 3:
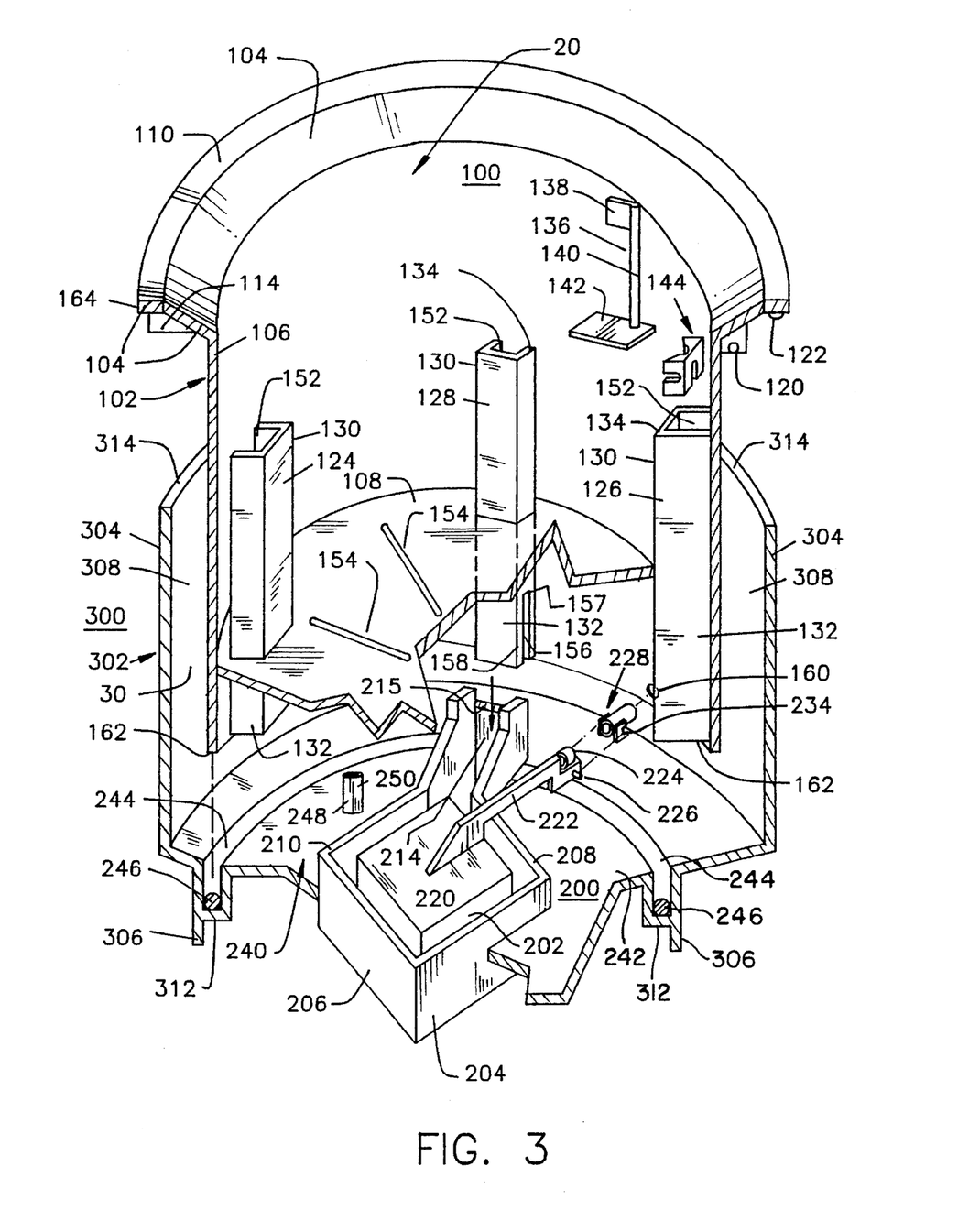
FIG. 3 is an enlarged vertical sectional view shown in perspective of the self-watering planter of the present invention having portions of some of the components thereof partially broken away.
Figure 4:
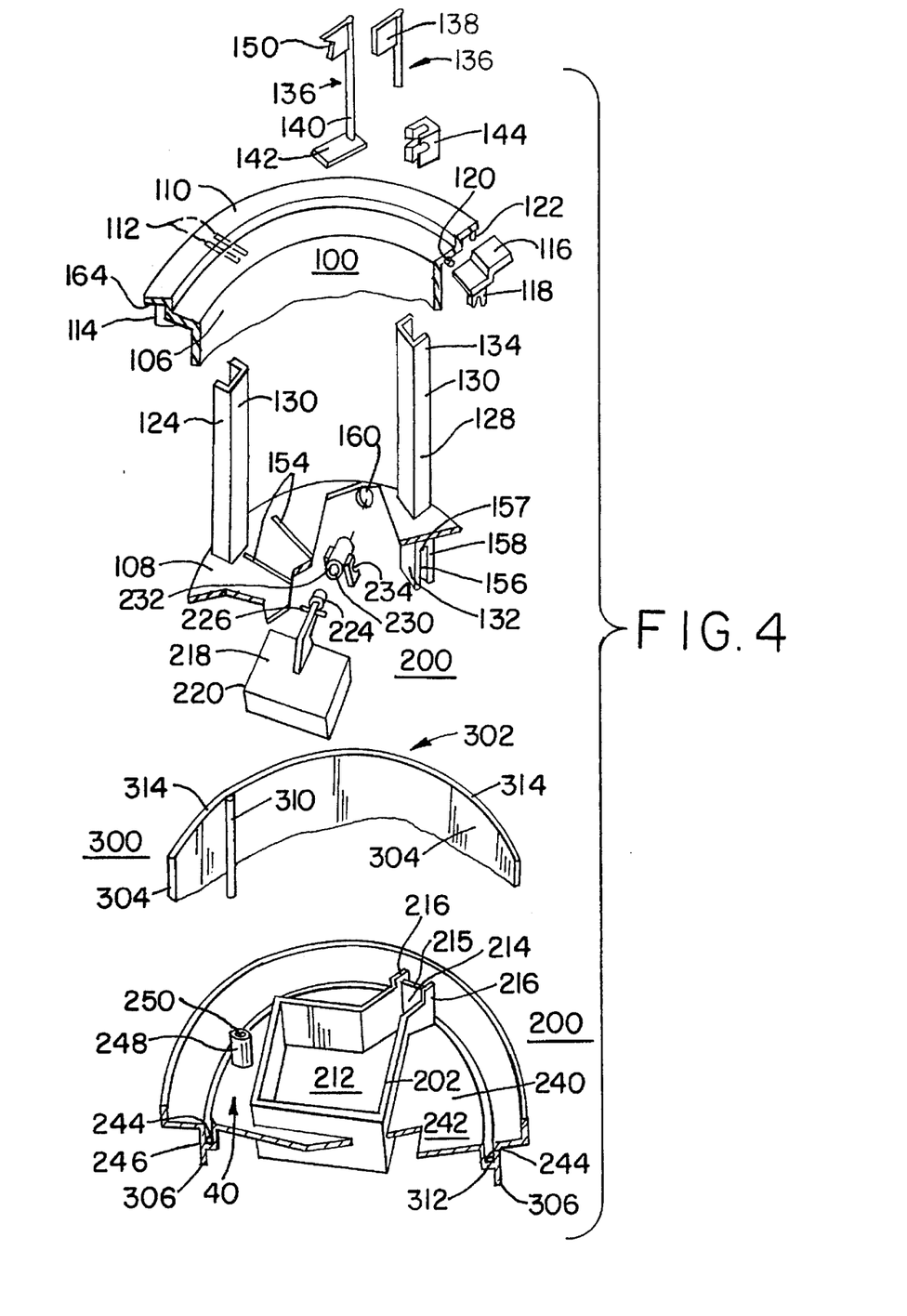
FIG. 4 is an exploded perspective view of the self-watering planter according to the present invention showing all component parts thereof broken away.

The inner container assembly 100, as depicted in FIGS. 2, 3, and 4, includes a cylindrical plastic housing 102 having an angular upper wall member 104, a vertical and cylindrical inner wall member 106, and a circular bottom member 108. The angular wall member 104 consists of an upper rim edge 110, key rib retainers 112, and spacer ribs 114. Also attached to the angular wall member 104 is a cover plate 116 approximately 1.5 inches in arc width and having pivot arms 118, a hinge pin 120, and a position stop pin 122 for rotating the cover plate 116 between up and down positions. When the cover plate 116 is in the up position, water 50 may be added to the water-receiving reservoir 30 from an outside source.

Attached to the inner side of wall member 106 are two identical vertically-disposed water-feeding channels 124 and 126 for transferring water only and a single vertically-disposed water-feeding channel 128 for performing watering and/or drying functions, to be explained. The water-feeding channels 124, 126, and 128 each have an upper section 130 and a lower section 132 and extend from near the top of the upper rim edge 110 to almost the bottom floor member 242 of the water-supplying chamber 40.

Figure 5:
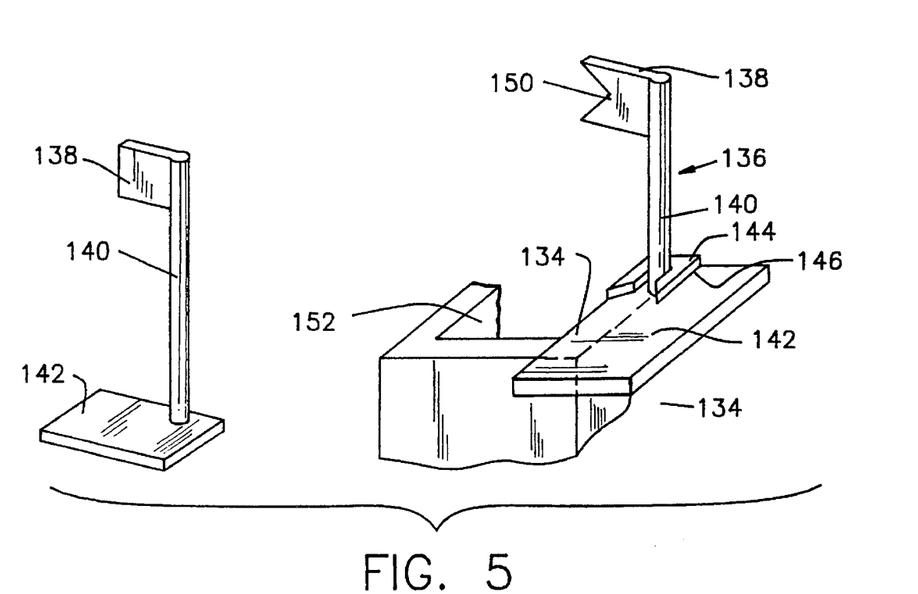
FIG. 5 is an enlarged perspective view, in detail, of the present invention showing the water-transfer lever assembly component.

A water-transfer lever assembly 136 is attached to each upper section 130 and is located on the top left edge 134 of each water-feeding channel 124, 126, and 128. The water-transfer lever assembly 136, as depicted in detail by FIG. 5, is formed of plastic and consists of a rectangular flag 138, a lever stem 140, a lever base 142, and a lever pivot housing 144. The flag 138 is permanently attached to the top of stem 140, and the bottom of stem 140 is permanently attached in the left corner of base 142. The lever pivot housing 144 is rotatably attached to the lever stem 140 and the lever base 142 by lever pivot housing arms 146, and pivot housing 144 is further attached to the top left edge 134 by a lever pivot housing slot 148. One of the lever flags 138 has a notch 150 therein to distinguish it from the other two lever assemblies 136, since the notched flag 150 is used on the watering/ drying channel 128. Each water-transfer lever assembly 136 rotates in a horizontal clockwise motion from edge 134, whereby base 142 can cover and close or partially close the top openings 152 of water-feeding channels 124, 126, and 128. The three water-transfer lever assemblies 136 control the quantity of water 50 transferred from water-feeding channels 124, 126, and 128 to the potting material 60 in chamber 20, in a manner to be explained.

The water-feeding channels 124, 126, and 128 extend through the bottom member 108 of the inner container assembly 100, and the bottom member 108 is located approximately an inch above the water basin floor member 242. The bottom member 108 is permanently molded with the inner cylindrical wall 106. There are a plurality of aeration slits 154 formed within bottom member 108 in a circular pattern. On the lower section 132 of water-feeding channel 128 only, there is a slot 156 with a slant top cut 157 in the bottom side channel walls 158. This is for the placement of water-feeding channel 128 by sliding the slot 156 into the float tank wall 214 with a slant top 215 in the water-supplying chamber 40. Also, there is a hole opening 160 located below bottom member 108 on inner wall member 106 for the attachment of float assembly 218, in a manner to be explained.

Figures 6A, 6B:
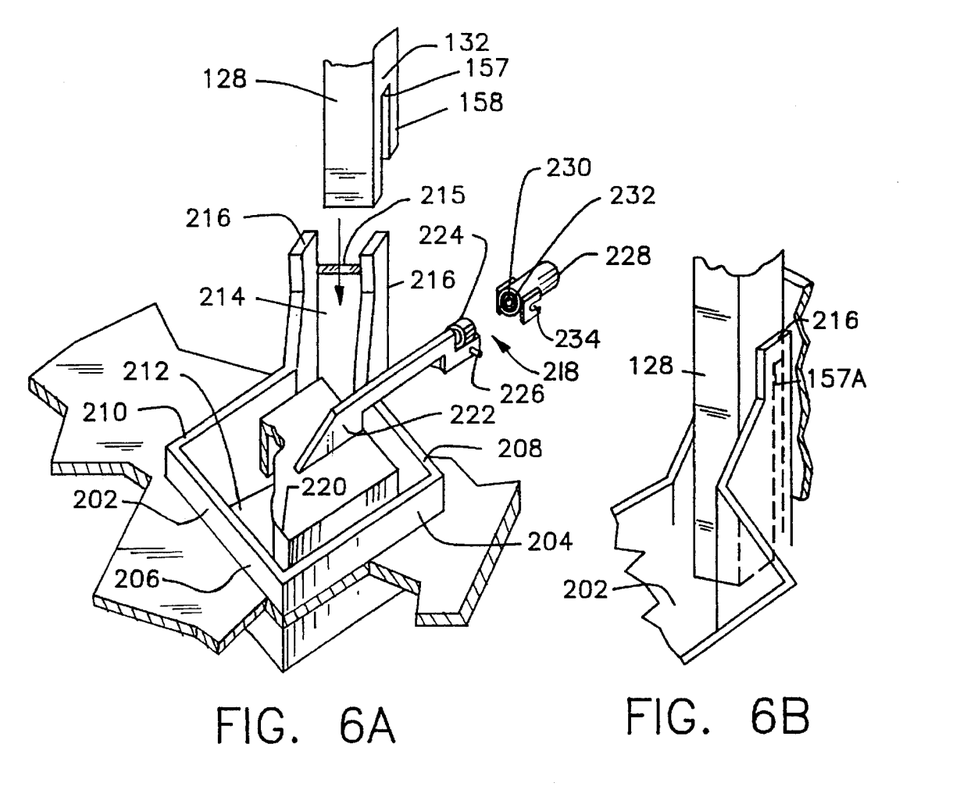
FIG. 6A is an enlarged perspective view, in detail, of the present invention showing the float assembly component.
FIG. 6B is an enlarged perspective view, in detail, of the present invention showing the water/drying channel sitting in place in the float tank.
Figure 7:
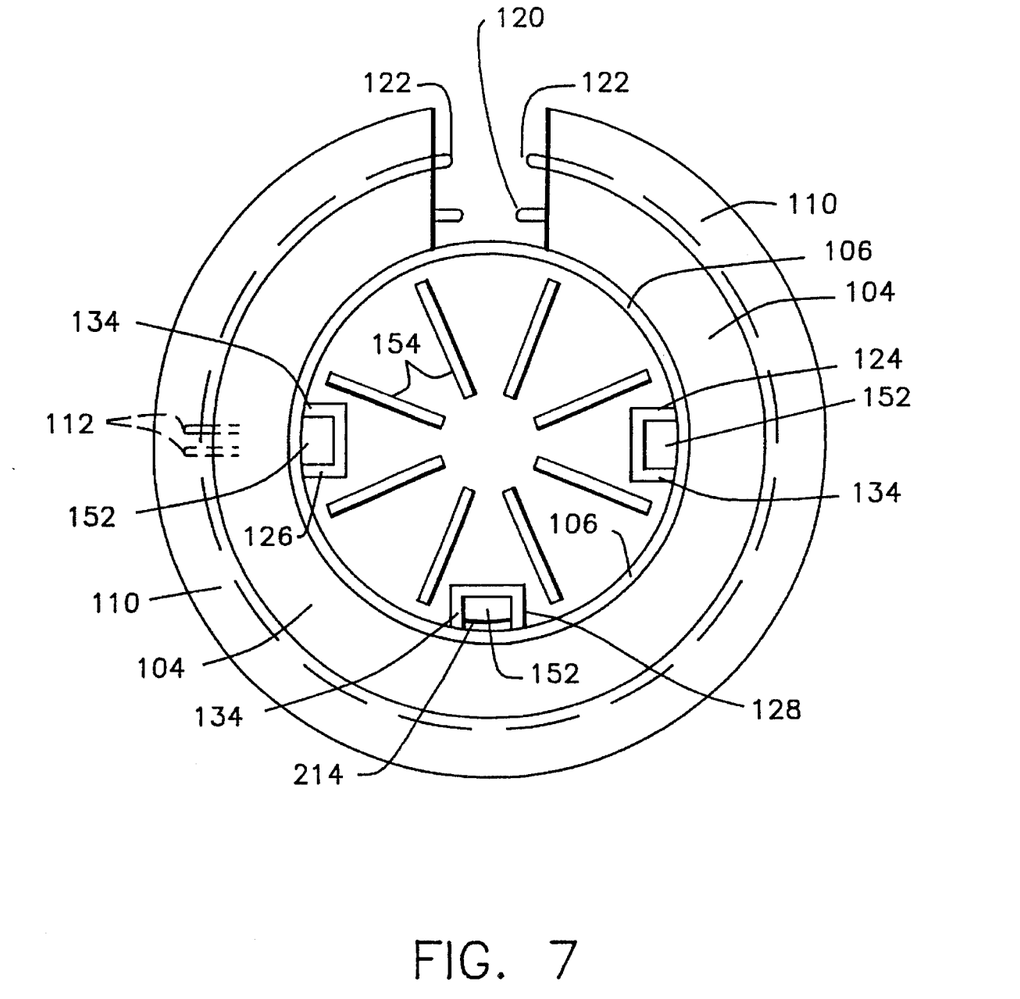
FIG. 7 is a top plan view of the present invention in an assembled condition.
Figure 8:
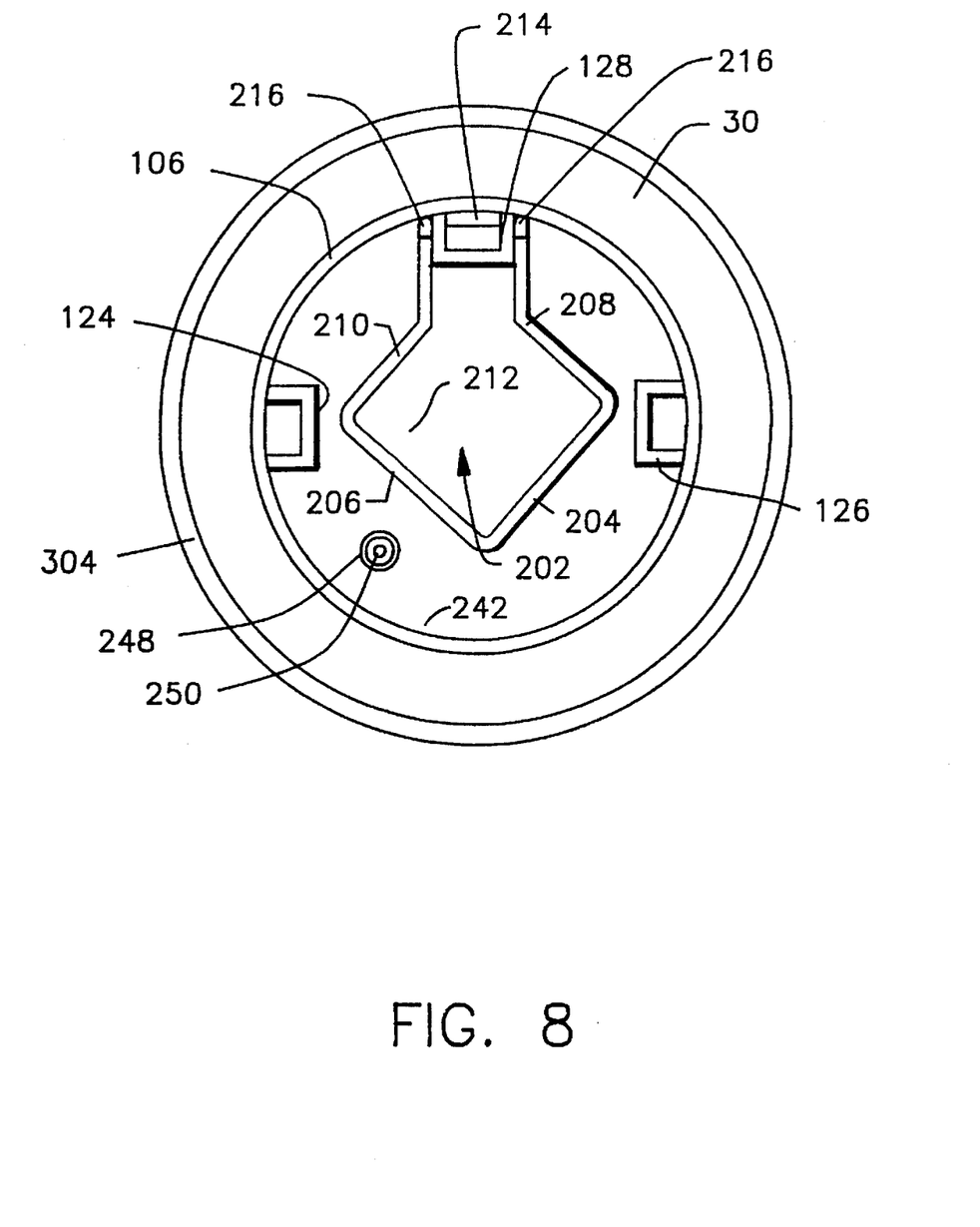
FIG. 8 is a top sectional view of the present invention taken along the section line 8—8 of FIG. 1B.

The support assembly 200, as depicted in detail in FIGS. 2, 3, 4, and 6, includes an inner float tank water chamber 202, a float assembly 218 disposed therein, and an outer water basin or chamber 240. As shown in FIG. 6, the float tank water chamber 202 is surrounded by the outer water basin or chamber 240, and the two together form the bottom water-supplying chamber 40.

The float tank water chamber 202 includes a front wall 204, a left sidewall 206, a right side angular wall 208, an angular rear wall 210, a bottom member 212, and a top member 108. The walls 204, 206, 208, and 210 and bottom member 212 all extend below the level of basin floor member 242. As an integral part of the angular rear wall 210 and right side angular wall 208 are a wall 214 with a slant top 215 and cover guide panels 216 for receiving and mounting of watering/drying channel 128. The top slant edge 215 of the wall 214 jointly meets the slant top cut 157 of slot opening 156 of the bottom side channel walls 158 of water and drying channel 128 for a close fit. The wall 214 with a slant top 215 is slightly higher than the float tank wall tops, which prevent any water 50 in water basin chamber 240 from entering into the seam where the slant top cut 157 of the slot 156 and slant edge 215 of the wall 124 meet. The guide panels 216 at both sides of the wall 214 cover up the tiny side seams 157A where the slant top cut 157 of the slot 156 and the slant top 215 of the wall 214 join together and meet. When mounted in the above manner, the water and drying channel 128 is connected to the float tank water chamber 202 for the transfer of water and nutrients 50 from chamber 202, through channel 128, to the potting material 60 in chamber 20.

The float assembly 218 is disposed within the interior area of the float chamber 202 and is attached through hole opening 160 of inner wall 106. Float assembly 218, as depicted in detail by FIG. 6, includes a float buoy 220 having a float buoy arm 222 attached to a rounded float seal head 224 and float pivot pins 226, which are connected to a float pivot component 228. The float pivot 228 has a water hole opening 230, an O-ring seat and seal 232, and pivot pin retainers 234. The seal head 224 is in close proximity to water hole opening 230. The float buoy 220 is of a rectangular shape and is made of a light density material, such as styrofoam, balsa, cork, or a hollow plastic receptacle (which acts as a buoy).

The outer water basin chamber 240 includes a cylindrical wall member 106, a (top) circular member 108, and a water basin floor member 242. The bottom circular edge 162 of wall member 106 fits into a circular U-channel 244 located on the outer edge of the basin floor 242 and is sealed tight by an O-ring 246 to prevent water 50 from leaking to the outside and defines the bottom water-supplying chamber 40. Attached to the water basin floor 242 is an air vent nipple 248 having an air hole opening 250 for supplying air 70 in order to aerate the potting soil 60 through the plurality of aeration slits 154 formed in the bottom member 108. Air vent nipple 248 is taller than the float tank wall members 204, 206, 208, and 210 so as to prevent any water 50 in the outer water basin chamber 240 from entering the air hole opening 250 of air vent nipple 248. The joining of wall member 106 to basin floor 242 creates a water gap 252 for the passing of water 50 into water-feeding channels 124 and 126, respectively.

The outer container assembly 300, as depicted in detail in FIGS. 2, 3, and 4, includes a cylindrical plastic having an outer cylindrical vertical wall member 304 and a plurality of support legs 306 that are integrally molded as part of the outer basin floor member 242. Molded on the inside surface 308 of wall member 302 is a vertical key rib 310 for assembly purposes. The support legs 306 are located on the bottom surface 312 of circular U-channel 244.

When inner container assembly 100 and outer container assembly 200 are properly nested, the upper rim edge 110 on angular wall member 104 is spaced from the upper rim edge 314 of wall member 304 to define an evaporation gap 316. The outer housing 302 is made of a partially-transparent plastic, so the user may ascertain the level of water 50 in the water reservoir 30.

To assemble the self-watering planter assembly 10, the following steps should be performed sequentially. The assembler starts with the inner container assembly 100 and attached the cover plate 116 to the upper rim edge 110 of upper angular wall 104 by snapping the cover plate pivot arms 118 into the cover plate hinge pins 120. The three water-transfer lever assemblies 136 are placed on the top left edge 134 of the opening 152 of water-feeding channels 124, 126, and 128. The water-transfer lever 136 is rotatably attached to the lever pivot housing 144 by snapping lever stem 140 together with base 142 into the lever pivot housing arms 146. Each assembled water-transfer lever assembly 136 is then attached tightly to each water-feeding channel 124, 126, and 128 by placing the lever pivot housing slot 148 firmly on the top left edge 134 of upper section 126. The notched flag 150 is used for watering/drying channel 128.

In the support assembly 200, the float assembly component 218 is assembled as follows: first the float pivot component 228 is movably attached to the float buoy arm 222 by hooking the float pivot pins 226 behind float pivot pin retainer 234. Next, the assembled float component 218 is attached tightly to the inner wall 106 by inserting the float pivot component 228 through hole opening 160. The float pivot water hole opening 230 is surrounded by an O-ring 232 to insure for water tightness when it is closed by the rounded float seal head 224 in operation.

Next, the inner container assembly 100, the support assembly 200, and the outer container assembly 300 are detachably nested together, as shown in FIG. 3, to form the unitary, double-walled planter assembly 10. This is accomplished by placing the bottom circular edge 162 of wall member 106 into the circular U-channel 244. As the two container assemblies 100 and 300 are being detachably nested together, they are properly aligned by the matching (lining-up straight) of the key rib retainers 112, which are located on the underside surface 164 of the upper angular wall 104, and the key rib 310 located on the inside surface 308 of outside wall 304. This properly aligns inner container 100 and outer container 300. To prevent any water leakage at the U-channel joint 244, a thin O-ring 246 is placed on the bottom of U-channel 244. This insures water tightness between inner and outer walls 106 and 304.

To minimize any play or movement of the free-standing, outer plastic housing 302 when the planter assembly 10 is fully assembled, a plurality of equally-placed spacer ribs 114 (7 to 12) are provided on the underside area 164 of the upper rim edge 110 of angular wall 104. The spacer ribs 114 act as wedges between the inner wall member 106 and outer wall member 304, thereby minimizing any play or movement of walls 106 and 304 relative to each other when planter assembly 10 is moved about.

With the nesting completed, water-feeding channels 124 and 126 extend almost to the bottom of the water basin floor 242, thereby leaving a small water gap 252 for water and nutrients 50 to move from water basin 240 to water-feeding channels 124 and 126. Similarly, the watering/drying channel 128 extends almost to the bottom of the float tank floor member 212, leaving a small water gap 252, so that water 50 may be transferred from float tank 202 into watering/drying channel 128.

OPERATION OF THE INVENTION

To operate the self-watering planter assembly 10, the user first fills water-feeding channels 124, 126, and 128 with a natural-absorbent material, such as sand, vermiculite, or potting soil 60, up to the top openings 152. Next, the user fills the inner container chamber 20 with potting soil 60 and plants 80 to a point at least slightly higher than the top openings 152 of water-feeding channels 124, 126, and 128. This is done to insure that the soil materials 60 in the water-feeding channels 124, 126, and 128 and the inner container 20 are in contact with each other for capillary action to occur for water transfer and flow.

Water is then poured into the water-receiving reservoir 30 through the opening in the upper angular wall 104 by lifting up the cover plate 116 on the rim edge 110. The water in reservoir 30 then flows into the bottom water-supplying chamber 40 via the float pivot water hole opening 230 formed in the lower inner wall 106. The water at first fills the outer water basin chamber 240 up to the top of the walls of float tank 202, and then the water overflows into the float tank chamber 202 until the float buoy 220 rises within float tank 202 and closes the pivot water hole opening 230. This is caused by the float assembly 218 and rounded float seal head 224 pivoting in a lateral motion via the float pivot pins 226 and pivot pin retainers 234, until seal head 224 engages and closes water opening 230 and thereby stops the flow of water from reservoir 30 into chambers 202 and 240. To increase the buoyancy of float buoy 220 in the water section of float tank 220, the float tank floor 212 is somewhat lower than the water basin floor 242 of the outer water basin chamber 240. The water in the float tank 202 operates independently of and is unaffected by the water level in the outer water basin chamber 240.

The water 50 in the bottom water-supplying chamber 40 in effect has two watering zones. The first watering zone is the outer water basin 240, which supplies water 50 to the water-feeding channels 124 and 126, which are used only for watering, and the second watering zone is the inner float chamber 202, which supplies water 50 to the watering/drying channel 128. Preferably, the water-feeding channels 124 and 126 are located opposite to each other on the inner container wall 106 and come in close contact with but are spaced apart from water basin floor 242 by the gap 252. The water 50 passes into each of the water-feeding channels 124 and 126 through the water gap 252, where the potting soil 60 in each of the water-feeding channels 124 and 126 acts as the capillary medium through which the water 50 is transported up through the soil 60 of each water-feeding channel 124 and 126 and out through the top openings 152. The water 50 is then transferred throughout the potting soil 60 in the inner container 20 to the plant 80 by capillary flow action. The capillary flow action continues until the water 50 in the outer water basin 240 dries up.

The water-feeding channel 128 functions differently than channels 124 and 126, since channel 128 is for both watering and drying. Watering/drying channel 128 is identified by a notched flag 150 located on the top left edge 134 of channel 128, thereby clearly identifying channel 128 to avoid confusion with the other two channels 124 and 126. The watering/drying channel 128 functions independently of the other two water channels 124 and 126, by having the float tank 202 completely walled off from outer water basin 240, with channel 128 disposed within float tank 202. The float tank water chamber 202 in conjunction with the watering/drying channel 128 provides the second watering zone and, in addition, provides a drying time interval after watering of the plant 80. Channel 128, with soil 60 therein, uses capillary action to draw water from float tank 202, up through channel 128, into soil 60 in inner container 20. With the water-transfer control lever assembly 136 in its fully or partially open position, there will be a continuous flow of water 50 from the float tank 202 up through water-feeding channel 128 into soil 60 of inner container 20. The partial closing of assembly 136 on channel 128 only slows down the rate of water 50 being supplied to soil 60, and no drying time interval occurs unless the control lever assembly 136 is fully closed on water-feeding channel 128.

In order to have a drying interval, the capillary action of the flow of water 50 to soil 60 must be suspended or stopped, and this can be done in two ways:

1) The first way is to close off the top openings 152 of all channels 124, 126, and 128 by the use of the water-transfer control levers 136, which shuts off the supply of water and nutrients 50 to the soil 60 and plants 80. This can be done manually on the control levers 136 and as often as needed. This provides an immediate drying interval.

2) The second way is to close off the top opening 152 of the watering/drying channel 128 only, which substantially stops the use of water 50 in float tank 202. Thus, float buoy 220 is maintained in the up position, so the seal head 224 is maintained in its engaged position, thereby closing off the water hole opening 230 of the reservoir 30. Thus, water 50 in the outer water basin 240 is eventually used up through water-feeding channels 124 and 126, and as long as the watering/drying channel 128 stays closed, only a minuscule amount of water is transferred to the potting soil 60. This constitutes a drying time interval, which results automatically when water-feeding channel 128 is closed and the aforementioned sequence occurs. However, the starting of the drying interval is delayed until the water in outer water basin 240 is used up.

During this drying time interval, water level 50 in float tank chamber 202 starts to lower for two reasons. First, water 50 evaporates spontaneously, and second, it continues to flow through the drying channel 128 because of a minuscule capillary water flow through a narrow gap between lever plate 142 and inner wall 106 of housing 102. As a result, water level 50 in float tank chamber 202 lowers sufficiently so that the float seal head 224 pivots away from the water hole opening 230 by way of the buoy 220 pivoting downwardly. This action allows additional water 50 to flow from water reservoir 30 and into the outer water basin 240 which had been empty during the drying time interval. When this happens, the water 50 in the outer water basin chamber 240 is transferred up the water-feeding channels 124 and 126 again, to the potting soil 60, via the capillary action previously discussed. This ends the drying time interval. The water 50 will continue to flow into the outer water basin 240 and then overflow into the float tank chamber 202. This causes the water level in the float tank 202 to rise again, which causes the float buoy 220 to move upwardly and causes the pivot arm 222 to move the float seal head 224 to again close the water hole opening 230, stopping the flow of water 50 into the outer water basin chamber 240.

With the addition of new water, a new cycle of watering begins. For plants 80 that do not require drying after watering, all water-feeding channels 124, 126, and 128 may be left in their open mode. Under this condition, water 50 in float tank 202 lowers along with water 50 in outer water basin 240, and the float component 218 will let in new water 50 before water basin 240 is dry. This condition is insured by making water tank 202 smaller than water basin 240.

When planter assembly 10 is filled with potting soil 60 and plants 80, only the top section of the water-control assemblies 136 (flags 138 and 150) are above the potting material 60 and are visible. When the flags 138 and 150 are turned to the left in a counterclockwise motion, they stop at a 90° angle, and the lever base 142 uncovers the top opening 152 of water-feeding channels 124, 126, and 128, permitting maximum water transfer (maximum capillary flow action via maximum contact) between the potting soil 60 in inner container 30 and the potting soil in channels 124, 126, and 128. To reduce the water 50 supply to the potting soil 60, the flags 138 and 150 are partially turned to the right in a clockwise motion. The lever base 142 partially covers the top opening 152 of the water-feeding channels 124, 126, and 128, which reduces the water transfer or capillary flow action to the potting soil 60. Incremental changes may be made by turning the flags 138 and 150 (more or less) slightly, either to the right for reducing water transfer or to the left for increasing water transfer.

Once all of the water-transfer control levers 136 are properly set according to the botanical needs of the plant(s) 80 in planter assembly 10, the watering (self-watering) and/or watering and drying intervals (self-drying) are automatic. Depending upon the size of water reservoir 30 and the size of inner container 20 for the potting soil 60, the supply of water and nutrients 50 in the reservoir 30 should last between six to twelve weeks. If the outer shell housing 302 is made of a partially-transparent plastic wall member 304, the changing water 50 level is visible from the outside without the need for any marker or indicator for refilling of water 50 to reservoir 30.

For aeration of the potting soil 60 for required nitrogen ($N_2$), oxygen ($O_2$), and carbon dioxide ($CO_2$) needed for the growth and well being of the plant(s) 80 in the planter assembly 10, there is a plurality of long thin aeration slits 154 located on the circular bottom member 108. To supply the required air 70 to these aeration slits 154, there is an air vent nipple 248 having an air hole opening 250 located on the outer water basin floor 242. The air hole opening 250 of air vent nipple 248 draws air 70 from the bottom 312 of the planter 10, which sits on a plurality of support legs 306.

ADVANTAGES OF THE INVENTION

The primary advantage of the present invention is that planter assembly 10 has both a self-watering system and a self-drying system where other planters have only a self-watering system.

Another advantage of the present invention is that planter assembly 10 has an open water reservoir 30 of higher volumetric capacity without the need of water reservoir 30 to be in an air-tight walled enclosure or a big or deep open air water bowl below the planter, as in most other self-watering planters.

Another advantage of the present invention is to mold the watering channels and the watering/drying channels right into the inner wall of the planter, thereby clearing the center area of the container of any fixture that may hinder the planting activity.

Another advantage of the present invention is that it has a simplified water-transfer control device 136 for the transferring of water 50 to the soil material 60 of the planter 10 without the need of any complex mechanical or electrical means, as shown in other prior art planters.

Another advantage of the present invention is in using the water-transfer control levers 136, small incremental changes can be made for watering of plants 80 on a continuous basis without overwatering or underwatering the plant(s) 80, thereby meeting their botanical requirements of water, nutrients, and air. However, in other planters, the watering is on a continuous basis without sufficient control, such that the plants can be overwatered or underwatered, which could affect the growth and well being of the plant(s) involved. Within this concept, the present invention provides an increased capability of maintaining the proper level of moisture for the plant during its growth, whereas prior planters have a continuous watering system.

Another advantage of the present invention is that planter 10 provides an automatic means in which to give a watering interval and a drying time interval between watering for plants that require such botanic attention, whereas other planters have only a continuous watering with no drying time interval means connected to the planter.

Another advantage of the present invention is that the self-watering planter 10 provides a simplified top downward and out inward (centripetal) watering by the vertical water-feeding channels, inducing the roots of the plant in the planter to grow upward and outward, thereby reducing the danger of concentrating the roots right below the plant and the roots growing into the water basin below through the air vent holes, as in most other bottom upward self-watering planters.

Another advantage of the present invention is that the self-watering planter 10 provides a means of water transfer using capillary action via water-feeding channels 124, 126, and 128 without the use of fabric wicks or synthetic material wicks as the carrier of water and nutrients to the soil as in prior self-watering planters.

Another advantage of the present invention is that the self-watering planter 10 has a larger water reservoir 30 capacity and finite controlling of water 50 and nutrients to the soil material 60 and plant(s) 80, so there can be longer time periods in the range of six to twelve weeks before any new water and nutrients have to be added to the water reservoir 30. This may be compared to prior self-watering planters having enough water reservoir capacity for only a few to several weeks at a time.

Another advantage of the present invention is that the self-watering planter 10 provides an easy procedure for assembling and/or repairing by detachably nesting/unnesting of its component parts in which there is a minimum amount of movable components. This may be compared to prior self-watering planters having numerous parts and components and are so constructed that repair or replacement of a part is very difficult.

In addition, the present invention provides more moisture to the exterior of the plant(s) 80 via the moisture rising out of the surface of the potting soil 60 in the inner container chamber 20 by permitting water evaporation through the side gap 316 at the upper rim edge 110 of angular wall member 102. The side evaporation gap 316 can also be a vertical opening evaporation gap, depending upon the structure and placement of the upper angular wall 102.

There is great flexibility and latitude in applying the concepts of the present invention. The self-watering planter 10 may have different shapes, such as square, triangular, trapezoidal, rectangular, or oval. The planter 10 may have different sizes where the housing shell may be taller, wider, or taller and wider. The water reservoir 30 may have a greater volumetric capacity by increasing the space between the outer and inner walls 304 and 106. The number, size, shape, and length of the built-in (molded) water channels 124, 126, and 128 may be changed and manufactured according to the size and shape of planter 10. Since only the inner container chamber 20 contains the potting material 60, the plant(s) 80, and all the accessories, it is easy for the inner container assembly 100 to be detachably unnested from the outer container assembly 300, so that the support assembly 200 and outer shell housing 302 may be repaired, cleaned and/or replaced with virtual ease without disturbing the plant(s) for any long length of time. The planter 10 can be also made from materials such as aluminum, brass, copper, rubber, or the like, but plastic is preferred.

Still another advantage of the present invention is that the self-watering planter 10 concept may be used on any sizes, shapes, and design materials where the planter 10 can match and blend in with its surroundings, whether at the office, home, mall, or other indoor-type structures.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A planter assembly for receiving a plant and automatically controlling the amount of water and nutrients supplied to said plant by controlling the periods of water feeding and the intervening dry periods, comprising:

a) an inner container assembly including an inner container for receiving a plant and soil;

b) an outer container spaced from and surrounding said inner container and defining therebetween a water-receiving chamber;

c) a water-supplying chamber for receiving water from said water-receiving chamber;

d) means for automatically supplying water from said water-receiving chamber to said water-supplying chamber in response to the water level in said water-supplying chamber;

e) said inner container assembly including water-feeding channels connected to said water-supplying chamber for transferring water from said water-supplying chamber to said water-feeding channels for watering said plant; and f) each of said water-feeding channels having a water-feeding opening at its upper end for feeding water to said soil and plant, and wherein said water-feeding openings are below the soil level so as to provide a downward supply of water to said soil and plant.

2. A planter assembly in accordance with claim 1, wherein said outer container and said water-supplying chamber are integrally formed as one unit having means for detachably receiving said inner container assembly to assemble said planter assembly.

3. A planter assembly in accordance with claim 1, further including a cover for covering said water-receiving chamber and a door in said cover, which may be opened to supply water and/or nutrients to said water-receiving chamber.

4. A planter assembly in accordance with claim 1, wherein said water-feeding channels are adjacent to the wall of the inner container, so that an entire center area is clear for the plant and the potting soil.

5. A planter assembly in accordance with claim 4, wherein there are at least 3 water-feeding channels.

6. A planter assembly in accordance with claim 1, wherein said water-feeding channels are disposed within said inner container for receiving soil, which provides a capillary medium for transferring water from said water-supplying chamber to the soil in said inner container.

7. A planter assembly in accordance with claim 6, wherein one of said water-feeding channels is a watering/drying channel and is disposed within said inner container for receiving soil, which provides a capillary medium for transferring water from said water-supplying chamber to the soil in said inner container.

8. A planter assembly in accordance with claim 7, wherein said watering/drying channel has a water-feeding opening at its upper end for feeding water to said soil and plant, and wherein said water-feeding opening is below the soil level so as to provide a downward supply of water to said soil and plant.

9. A planter assembly in accordance with claim 1, further including closure means for opening and closing said water-feeding channels to control the amount of water supplied to the plant and soil.

10. A planter assembly in accordance with claim 1, further including a watering/drying channel connected to said water-supplying chamber for controlling the length of said dry periods and the amount of water supplied to the plant and soil.

11. A planter assembly in accordance with claim 1, wherein said water-supplying chamber includes a first basin for receiving water from said water-receiving chamber and a second basin for receiving water from said first basin, and wherein said water-feeding channels are connected to said first basin for transferring water from said first basin to said water-feeding channels for watering said plant.

12. A planter assembly in accordance with claim 11, further including a watering/drying channel connected to said second basin for transferring water from said second basin to said watering/drying channel for watering said plant.

13. A planter assembly in accordance with claim 1, wherein said means for automatically supplying water includes a float assembly movable in response to the water level in said water-supplying chamber, said float assembly including means for opening and closing a water supply duct connecting said water-receiving chamber and said water-supplying chamber for automatically controlling the supply of water from said water-receiving chamber to said water-supplying chamber.

14. A planter assembly in accordance with claim 1, wherein said inner container includes air-receiving openings formed therein, and wherein said water-supplying chamber includes one or more air passageways formed therein for supplying air to the soil in said inner container through said air-receiving openings.

15. A planter assembly in accordance with claim 1, wherein said inner and outer containers may be round, square, rectangular, diamond, trapezoidal, or oval in shape.

16. A planter assembly in accordance with claim 1, wherein said inner and outer containers may be formed of plastic, aluminum, brass, copper, glass, or rubber material.

* * * * *